US012576685B2

(12) United States Patent
Reed et al.

(10) Patent No.: US 12,576,685 B2
(45) Date of Patent: Mar. 17, 2026

(54) HEAVY DUTY VEHICLE SUSPENSION WITH USER CONTROLLED PNEUMATIC ASSIST

(71) Applicant: FORETRAVEL, INC., Nacogdoches, TX (US)

(72) Inventors: Lyle Reed, Frisco, TX (US); John Arthur Hinz, Monticello, IN (US); Robin Scot Clements, Conway, AR (US)

(73) Assignee: FORETRAVEL, INC., Nacogdoches, TX (US)

( * ) Notice: Subject to any disclaimer, the term of this patent is extended or adjusted under 35 U.S.C. 154(b) by 0 days.

(21) Appl. No.: 18/456,029

(22) Filed: Aug. 25, 2023

(65) Prior Publication Data

US 2024/0083211 A1 Mar. 14, 2024

Related U.S. Application Data

(60) Provisional application No. 63/375,003, filed on Sep. 8, 2022.

(51) Int. Cl.
B60G 17/052 (2006.01)
B60G 3/20 (2006.01)
(Continued)

(52) U.S. Cl.
CPC ........... B60G 17/0528 (2013.01); B60G 3/20 (2013.01); B60G 11/27 (2013.01); B60G 21/005 (2013.01);
(Continued)

(58) Field of Classification Search
CPC ...... B60G 17/0528; B60G 3/20; B60G 11/27; B60G 21/005; B60G 13/14;
(Continued)

(56) References Cited

U.S. PATENT DOCUMENTS

| | | | | |
|---|---|---|---|---|
| 2,982,538 A | * | 5/1961 | Bourcier | B60G 15/12 267/64.15 |
| 4,206,934 A | * | 6/1980 | McKee | B60G 17/0528 280/5.515 |

(Continued)

FOREIGN PATENT DOCUMENTS

DE 102018112549 B4 * 11/2020 ............. B60G 17/04

OTHER PUBLICATIONS

Espace translation of DE 10 2018 112549 B4 (Year: 2018).*

*Primary Examiner* — Jason D Shanske
*Assistant Examiner* — Scott Lawrence Strickler
(74) *Attorney, Agent, or Firm* — Greer, Burns & Crain, Ltd

(57) ABSTRACT

A suspension kit is provided for use in heavy duty vehicles having an independent front suspension including air springs, the kit includes an anti-roll bar having two ends, each end configured for connection to the front suspension in operational relationship to an associated one of two front wheel assemblies, at least one ping tank in fluid communication with an associated one of the air springs, a valve in fluid communication between each at least one ping tank and the associated air spring, a control switch connected to each valve for moving the valve between an open position, allowing fluid communication between the at least one ping tank and the air spring, and a closed position, closing fluid communication between the at least one ping tank and the air spring. An associated front suspension is also provided.

9 Claims, 4 Drawing Sheets

(51) Int. Cl.

| | | |
|---|---|---|
| *B60G 11/27* | (2006.01) | |
| *B60G 13/14* | (2006.01) | |
| *B60G 21/00* | (2006.01) | |

(52) U.S. Cl.
CPC ........ *B60G 13/14* (2013.01); *B60G 2200/144* (2013.01); *B60G 2200/44* (2013.01); *B60G 2202/152* (2013.01); *B60G 2202/422* (2013.01)

(58) Field of Classification Search
CPC .......... B60G 2200/144; B60G 2200/44; B60G 2202/152; B60G 2202/422; B60G 17/056; B60G 17/044; B60G 17/048; B60G 17/0416; B60G 21/06; B60G 21/10
See application file for complete search history.

(56) References Cited

U.S. PATENT DOCUMENTS

| | | | | |
|---|---|---|---|---|
| 7,971,890 | B2 | 7/2011 | Richardson | |
| 8,485,543 | B2 | 7/2013 | Richardson et al. | |
| 9,762,408 | B2 | 9/2017 | Davis et al. | |
| 2004/0150142 | A1* | 8/2004 | Warinner | B60G 21/0551 |
| | | | | 267/3 |
| 2007/0102913 | A1* | 5/2007 | Ramsey | B60G 21/051 |
| | | | | 280/783 |
| 2010/0276901 | A1* | 11/2010 | Richardson | B60G 11/465 |
| | | | | 280/93.512 |
| 2020/0164711 | A1* | 5/2020 | Tuhro | B60G 17/0523 |
| 2021/0061040 | A1* | 3/2021 | Coombs | B60G 17/019 |
| 2021/0276643 | A1* | 9/2021 | Ellifson | B60B 35/007 |

* cited by examiner

HEAVY DUTY VEHICLE SUSPENSION WITH USER CONTROLLED PNEUMATIC ASSIST

RELATED APPLICATION

This application is a Non-Provisional of, and claims 35 U.S.C. 119 priority from, U.S. Provisional Application Ser. No. 63/375,003 filed Sep. 8, 2022, the entire contents of which are incorporated by reference herein.

BACKGROUND

The present invention relates generally to suspensions for heavy duty vehicles, and more specifically to an improved suspension for vehicles having air springs.

In the present application, heavy duty vehicles will generally refer to large motor coaches used for touring buses or for individual self-propelled motor homes, as well as other large vehicles using air springs, including, but not limited to fire engines, trash collection trucks, dump trucks, heavy duty delivery trucks, construction trucks, semi tractors and the like. Very often, users of such vehicles, particularly motor coaches, are susceptible to wind gusts, passing semis, bumps or potholes in the road, any of which can reduce stability of the vehicle and create steering issues. Also, many modern customers of such vehicles are used to driving sedans with relatively more responsive suspensions, and as such the conventional soft ride provided by air spring-equipped suspensions is deemed overly soft for their taste. Other customers more familiar with standard American luxury sedans often prefer a softer ride of the type provided by air spring-equipped suspensions.

Thus, designers of motor coach suspensions are faced with a dilemma of designing a softer riding suspension that makes highway cruising more comfortable, especially over long distances, but sacrifices responsiveness, or designing a relatively more responsive or stiffer suspension that increases responsiveness and improves handling, but sacrifices long-term cruising comfort. To date, a single suspension is not available that addresses both of the design/ performance objectives discussed above.

Accordingly, there is a need for an improved heavy duty vehicle suspension that addresses the design criteria discussed above and provides suitable products for both long-term riding comfort as well as improved, responsive handling to accommodate wind gusts, passing semi-trucks, road hazards and the like.

SUMMARY

The above-listed need is met or exceeded by the present heavy duty vehicle suspension with user controlled pneumatic assist, which is contemplated as being provided as original equipment with a new vehicle, or as an enhanced suspension kit that is retrofit onto existing vehicles having independent front suspensions with air springs.

Included in the present suspension is an anti-roll bar having two ends, each end mounted to a vehicle chassis in operational relationship to a corresponding vehicle front wheel assembly, and an auxiliary or ping tank pneumatically connected to a corresponding air spring also associated with one of the front wheel assemblies. Each ping tank is under user control through a control system including a valve and a control switch configured for operating the valve. When the valve is opened, the ping tank supplies additional compressible volume to the air spring, increasing the air spring volume, but also allowing fluid communication between the air spring and the ping tank. The increased volume lowers the pressure in the system, and as such provides a more comfortable ride. This is the relatively comfort-based, cruising or Touring Mode.

When the user wants a more responsive suspension, the control switch is actuated to close the valve, which traps the air in the air spring, since fluid communication between the air spring and the ping tank is prevented. The result is a more responsive, tighter handling, harder riding Sport Mode. In the preferred embodiment, the front shock absorbers are also tuned for use in a more responsive format. This performance is achieved by providing the shock absorbers with a pressure activated bypass valve.

When the user opts to convert from the Sport Mode to the Touring Mode, the control switch is actuated so that the valves are opened to permit air to flow from the air spring back to the ping tank.

In an embodiment, the present retrofit conversion kit includes an anti-roll bar, a pair of tuned shock absorbers, a pair of ping tanks, each with an associated control valve, and a control switch. In the preferred embodiment, the kit also includes associated pneumatic and mechanical connection fittings and brackets for securing the system to the front vehicle suspension.

In another embodiment a vehicle air spring-equipped suspension is provided with the an anti-roll bar, a pair of tuned shock absorbers, a pair of ping tanks, each with an associated control valve, a control switch and associated pneumatic and mechanical connection fittings and brackets.

More specifically, a suspension kit is provided for use in heavy duty vehicles having an independent front suspension including air springs, the kit includes an anti-roll bar having two ends, each end configured for connection to the front suspension in operational relationship to an associated one of two front wheel assemblies, at least one ping tank in fluid communication with an associated one of the air springs, a valve in fluid communication between each at least one ping tank and the associated air spring, a control switch connected to each valve for moving the valve between an open position, allowing fluid communication between the at least one ping tank and the air spring, and a closed position, closing fluid communication between the at least one ping tank and the air spring.

In an embodiment, the kit also includes a pair of tuned shock absorbers, each including a pressure activated bypass valve, the shock absorbers configured for assembly into the front suspension. Also preferred is that the kit further includes at least one bracket for securing each ping tank to a vehicle chassis.

In another embodiment, the control switch is located remotely from the front suspension, each valve is powered by an electric motor, the control switch is connected to each motor.

In another embodiment, an independent front suspension is provided for use in heavy duty vehicles, and includes a cross member, a pair of lower control arms connected to the cross member, each lower control arm connected to a knuckle assembly, a pair of upper control arms each connected between a vehicle chassis and the knuckle assembly, an air spring located between the vehicle chassis and the knuckle assembly, a wheel assembly connected to each knuckle assembly, an anti-roll bar having two ends, each end configured for connection to the front suspension in operational relationship to an associated one of two front wheel assemblies, at least one ping tank in fluid communication with an associated one of the air springs, a valve in fluid communication between each at least one ping tank and the associated air spring, and a control switch connected to each valve for moving the valve between an open position, allowing fluid communication between said at least one ping tank and the air spring, and a closed position, closing fluid communication between each ping tank and the air spring.

DETAILED DESCRIPTION

Figure 1:
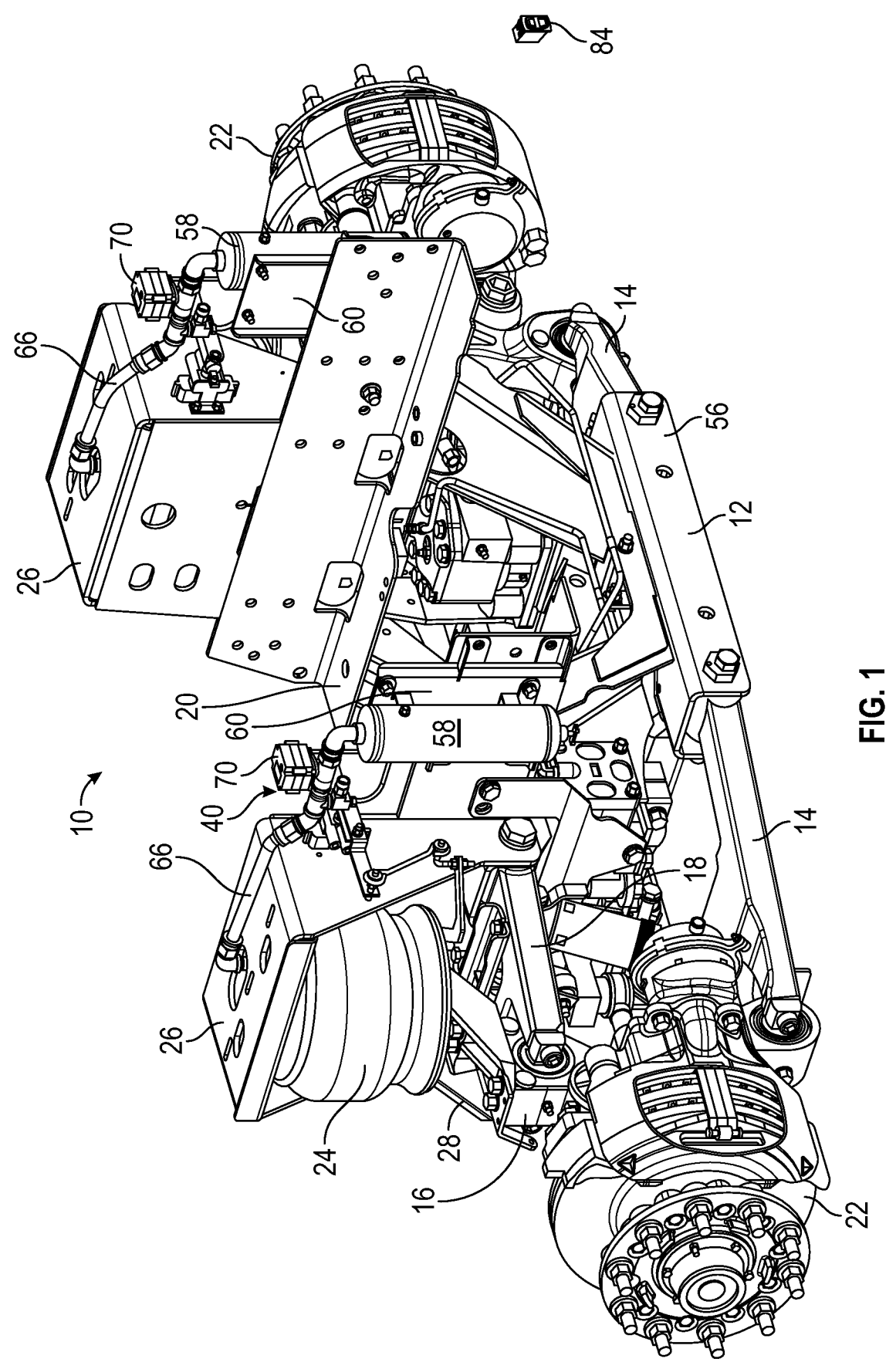
FIG. 1 is a front perspective view of a vehicle front independent suspension provided with the present enhanced pneumatic-assisted suspension system.
Figure 2:
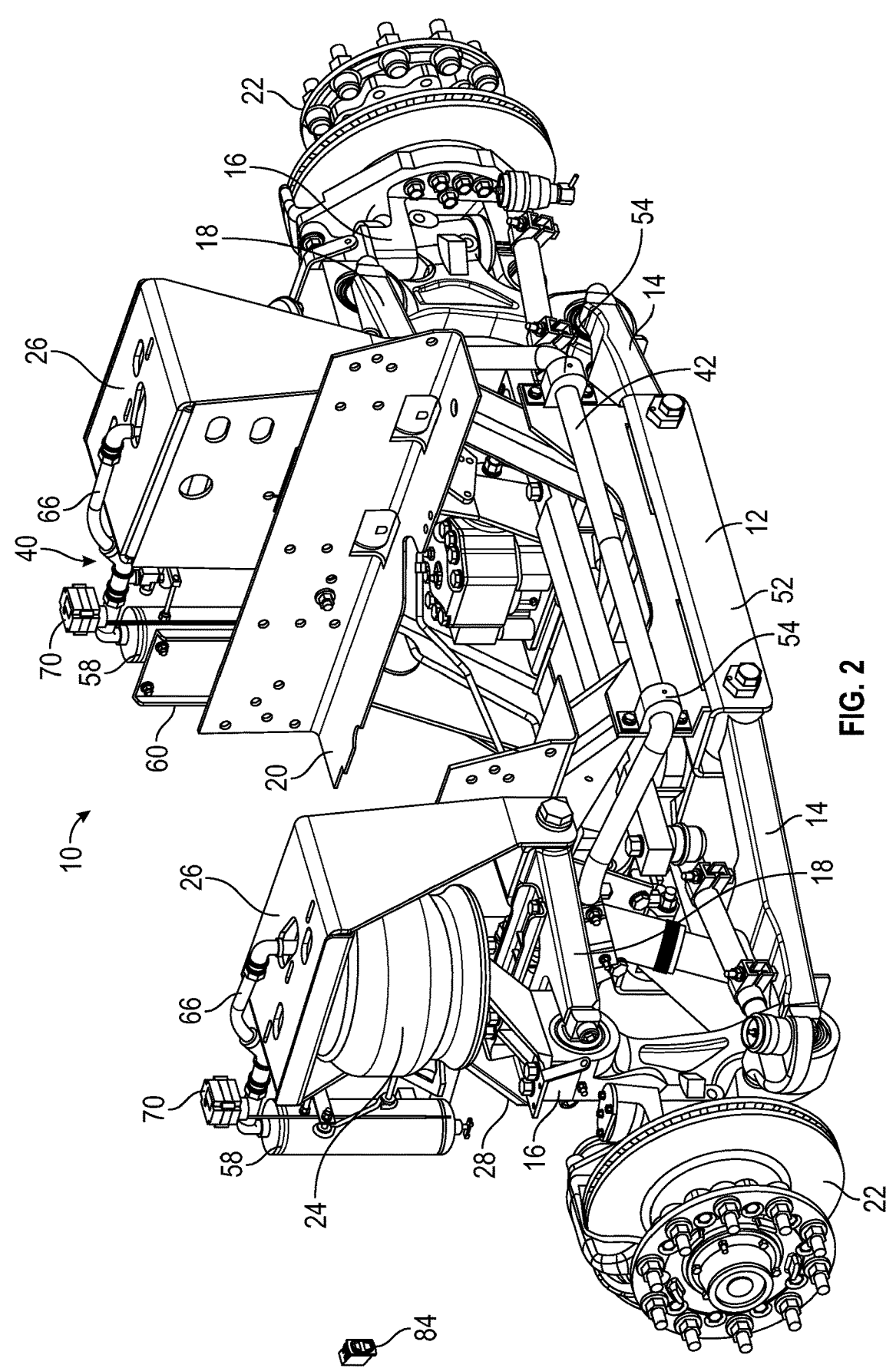
FIG. 2 is a rear perspective view of the front suspension of FIG. 1.

Referring now to FIGS. 1 and 2, an independent front suspension (IFS) suitable for use in heavy duty vehicles as defined above is generally designated 10. Such suspensions to are well known in the art, and suitable examples are described in U.S. Pat. Nos. 7,971,890; 8,485,543; and 9,762,408, all of which are incorporated by reference.

Figures 3A, 3B:
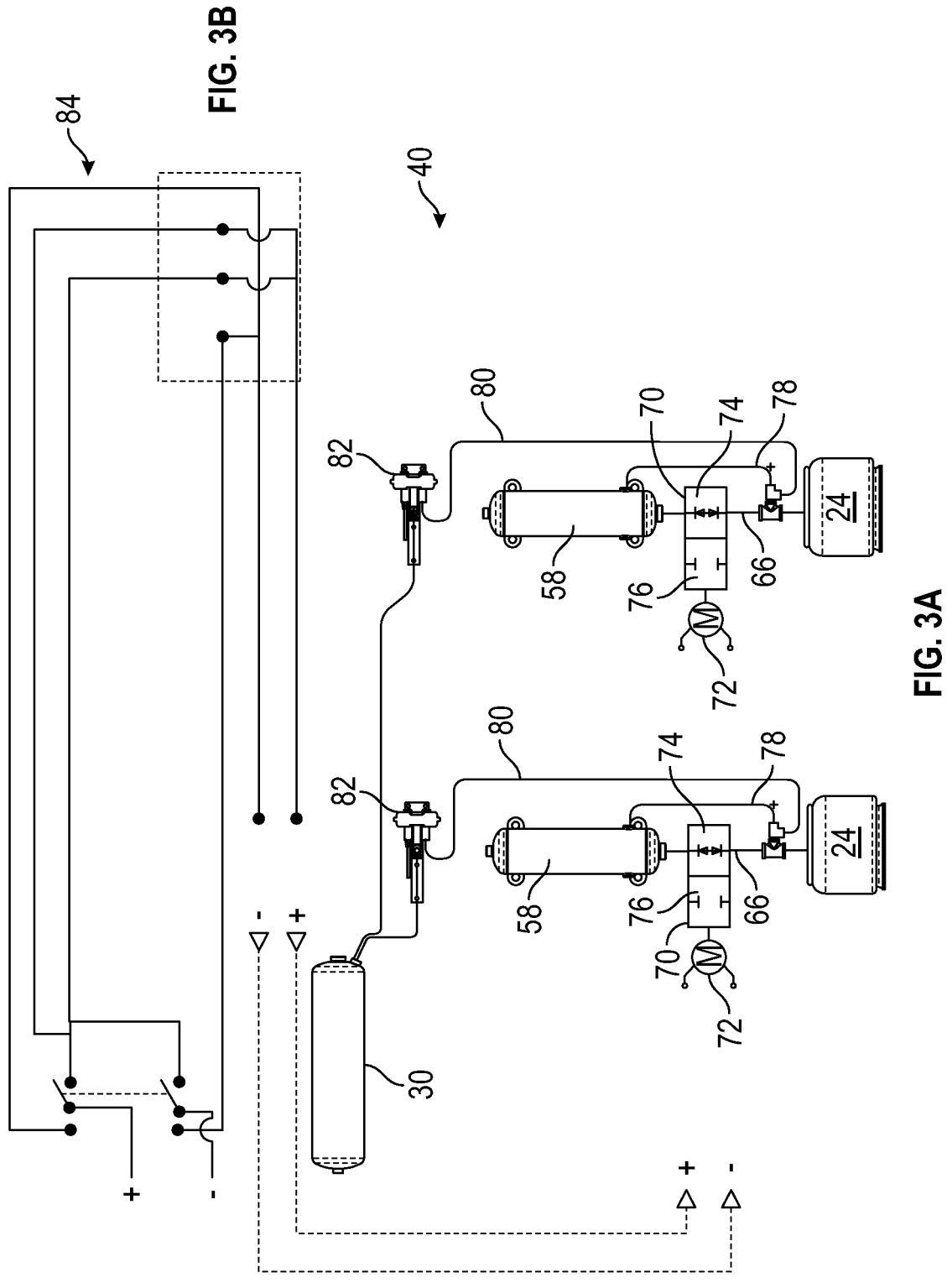
FIG. 3A is a schematic of the present pneumatic assisted suspension system.
FIG. 3B is an electrical schematic of the present control switch.

While the details of such suspensions 10 are generally known in the art, they typically include a central cross member 12 to which are connected a pair of lower control arms 14. At an opposite end, each lower control arm 14 is connected to a generally vertically projecting knuckle carrier 16. An upper control arm 18 is pivotally connected to the vehicle frame or chassis 20 and also to the knuckle carrier 16. A wheel assembly 22 is connected to each knuckle carrier 16, and a front road wheel (not shown) is connected to each of the wheel assemblies. An air spring 24 is disposed near each wheel assembly 22 and is located between a chassis bracket 26 and a knuckle bracket 28 associated with the knuckle carrier 16. As known in the art, the air spring 24 is in fluid communication with an air supply tank 30 (FIG. 3A).

Referring now to FIGS. 1-4, the present pneumatic assisted, operator-controlled suspension system is generally designated 40, and is constructed and arranged for use with the independent front suspension 10 having air springs 24, and similar units known in the art. It is also contemplated that the present system 40 is provided both with new vehicles as original equipment, and also available as a kit to be retrofit on existing vehicles.

Included in the system 40 is an anti-roll bar 42 having two ends 44 and 46, each end connected to an anti-roll bar link end 48. Further, each link end 48 is secured at a pivot joint 50 to the chassis 20 adjacent the upper and lower control arms 18, 14. In the preferred embodiment, the anti-roll bar 42 is also secured to a rear side 52 of the suspension 10 near the cross member 12 by bushings 54. As such, the anti-roll bar 42 is in operational relationship to an associated one of the two front wheel assemblies 22. Mounting the anti-roll bar 42 on a front side 56 of the IFS 10 is also contemplated.

Also included in the system 40 is at least one and preferably a pair of auxiliary or ping tanks 58. The ping tanks 58 provide extra volume to the pneumatic system 40 of the IFS 10, and are connected to be in fluid communication with an associated one of the air springs 24. A mounting bracket 60 defines a mounting point for each of the ping tanks 58, using threaded fasteners 62 or the like, and the mounting bracket is also provided with mounting apertures 64 for being secured to the chassis 20, also preferably using threaded fasteners or the like (not shown). It is also contemplated that the mounting bracket 60 is secured to the chassis 20 by welding or other known vehicle assembly techniques.

As seen in FIG. 3A, each ping tank 58 is connected by a conduit 66 to an associated one of the air springs 24, with a valve 70 connected in the conduit between the ping tank and the air spring. Preferably, the valve 70 is powered by a motor 72 into one of an open position 74 and a closed position 76. In the open position 74, pressurized air flows between the ping tank 58 and the air spring 24. In the closed position 76, fluid communication between the ping tank 58 and the air spring 24 is prevented.

In addition to the conduit 66, the ping tank 58 and the air spring 24 are provided with a bypass or pressure equalization line 78 connected to a tank line 80 and ultimately to the main system supply tank 30 through at least one and preferably two height control valves 82. By providing the bypass line 78, air is allowed to bypass the valve 70 in small amounts and prevents the system from developing low pressure that could lead to vehicle ride height changes. The height control valves 82 are set at the factory to determine vehicle ride height. These height control valves 82 are not adjustable by the user, whether or not the vehicle is in motion.

Figure 4:
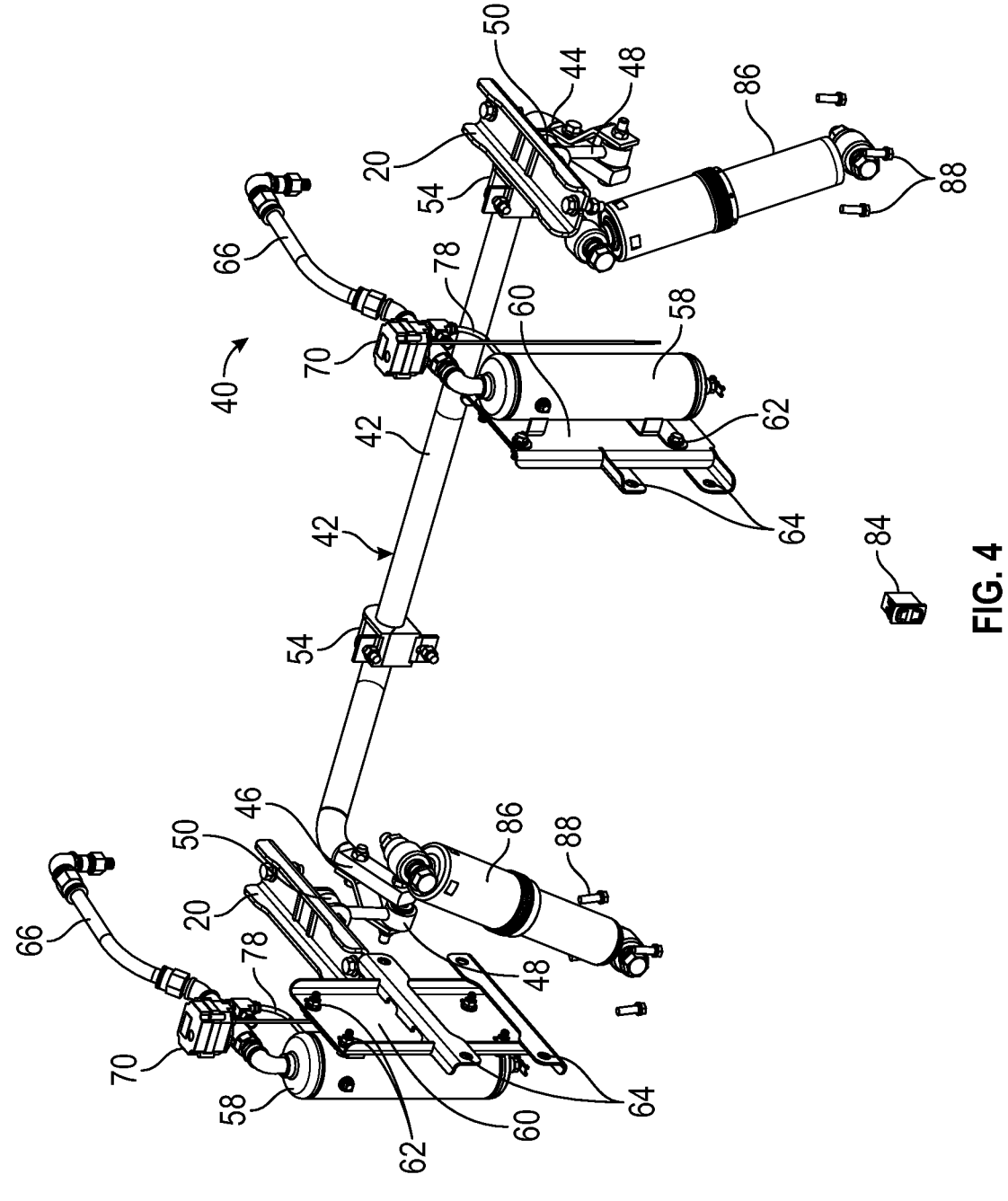
FIG. 4 is a top perspective view of the present suspension kit that provides the present pneumatic-assisted suspension system to conventional vehicles with airbag-equipped suspensions.

Referring now to FIGS. 3B and 4, a control switch 84 is connected to each of the valves 70 via the motors 72 for moving the valve between the open position 74, allowing fluid communication between each ping tank 58 and the corresponding air spring 24, and the closed position 76, closing fluid communication between each ping tank and the corresponding air spring. While the location may vary to suit the application, the control switch 84 is preferably located remote from the suspension system 40 on or near the vehicle dashboard to be accessible by the driver while the vehicle is in motion. As seen in FIG. 3B, the control switch 84 is preferably a double throw, double pole type switch that is electrically connected to each of the two motors 72. Thus, actuation of the control switch 84 simultaneously controls the operation of each of the valves 70.

As described earlier, for a relatively soft ride suitable for relatively comfortably highway cruising, the control switch 84 is actuated to move the valves 70 to the open position 74, which increases the air volume associated with each air spring 24, thus lowering the pressure within the air spring. In contrast, when more responsive suspension performance is desired, such as when the vehicle is subject to repeated wind gusts, passing semi-trucks, uneven road conditions or the like, the control switch 84 is actuated to move the valves 70 to the closed position 76. At that time, the relatively higher pressure in the air spring 24 is maintained.

Referring again to FIGS. 1, 2 and 4, it is preferred that the system 40 include at least one and preferably two tuned shock absorbers 86. In the present application a tuned shock absorber 86 is one provided with a pressure activated bypass valve for selectively reducing dampening. Those skilled in the art are familiar with the process of tuning shock absorbers to suit a particular application. In the present application, the desired shock absorber tuning is compatible with both the Touring Mode and the Sport Mode. Suitable shock absorbers 86 are commercially available from Thyssenkrupp Bilstein GmbH, headquartered in Ennepetal, Germany. The shock absorbers 86 are secured between the chassis 20 and the knuckle carrier 16 using threaded fasteners 88. In the preferred embodiment, the fasteners 86 are ratcheting locking-type threaded fasteners of the type sold by Nord-Lock, Inc. Clinton, PA.

While a particular embodiment of the present heavy duty vehicle suspension with user controlled pneumatic assist has been described herein, it will be appreciated by those skilled in the art that changes and modifications may be made thereto without departing from the invention in its broader aspects and as set forth in the following claims.

The invention claimed is:

1. A suspension kit for use in heavy duty vehicles having an independent front suspension including air springs supplied by an air supply tank, said kit comprising:
  an anti-roll bar having two ends, each end configured for connection to the front suspension in operational relationship to an associated one of two front wheel assemblies;
  at least one supplemental ping tank separate from said air supply tank and being separate from, and in fluid communication with an associated one of the air springs;
  a valve in fluid communication between each at least one ping tank and the associated air spring, each said valve powered by an electric motor for moving between an open position and a closed position;
  a control switch connected to each said electric motor for powering said valve and under user control for selectively moving said valve between the open position, allowing fluid communication between said at least one ping tank and the air spring for achieving a softer vehicle ride, and the closed position, closing fluid communication between said at least one ping tank and the air spring for achieving a more responsive vehicle ride, said positions determined by the user for achieving desired suspension performance;
  a pair of tuned shock absorbers, each including a pressure activated bypass valve, said shock absorbers configured for assembly into the front suspension; and a pressure equalization line connecting said air spring and said at least one ping tank to a tank line and to a main system supply tank through at least one height control valve for maintaining a predetermined vehicle ride height.

2. The suspension kit of claim 1, further including at least one bracket for securing said at least one ping tank to a vehicle frame.

3. The suspension kit of claim 1, wherein said control switch is located remotely from the front suspension.

4. An independent front suspension for use in heavy duty vehicles, comprising:
  a cross member;
  a pair of lower control arms connected to the cross member;
  each said lower control arm connected to a knuckle assembly;
  a pair of upper control arms each connected between a vehicle chassis and said knuckle assembly;
  an air spring located between the vehicle chassis and the knuckle assembly and supplied by an air tank;
  a wheel assembly connected to each said knuckle assembly;
  an anti-roll bar having two ends, each end configured for connection to the front suspension in operational relationship to an associated one of two front wheel assemblies;

at least one supplemental ping tank separate from said air tank and being separate from and in fluid communication with an associated one of the air springs;
  a valve in fluid communication between each at least one ping tank and the associated air spring, each said valve powered by an electric motor for moving between an open position and a closed position;
  a control switch connected to each said electric motor for powering said valve and under user control for selectively operating said valve for moving said valve between the open position, allowing fluid communication between said at least one ping tank and the air spring for achieving a softer vehicle ride, and the closed position, closing fluid communication between said at least one ping tank and the air spring for achieving a more responsive vehicle ride, said positions determined by the user for achieving desired suspension performance; and
  a pressure equalization line connecting said air spring and said at least one ping tank to a tank line and to a main system supply tank through at least one height control valve for maintaining a predetermined vehicle ride height.

5. The suspension of claim 4, further including a pair of tuned shock absorbers, each including a pressure activated bypass valve, said shock absorbers configured for assembly into the front suspension.

6. The suspension of claim 4, further including at least one bracket for securing said at least one ping tank to a vehicle frame.

7. The suspension of claim 4, wherein said control switch is located remotely from the front suspension.

8. A suspension kit for use in heavy duty vehicles having an independent front suspension including air springs supplied by an air supply tank, said kit comprising:
  an anti-roll bar having two ends, each end configured for connection to the front suspension in operational relationship to an associated one of two front wheel assemblies;
  at least one supplemental ping tank separate from said air supply tank and being separate from, and in fluid communication with an associated one of the air springs;
  a valve in fluid communication between each of two ping tanks and associated air springs, open position and a closed position;
  a control switch connected to each said electric motor for simultaneously powering said valves and under user control for selectively moving said valves simultaneously between the open position, allowing fluid communication between both said ping tanks and each air spring for achieving a softer vehicle ride, and the closed position, closing fluid communication between both said ping tanks and each air spring for achieving a more responsive vehicle ride, said positions determined by the user for achieving desired suspension performance;
  a pair of tuned shock absorbers, each including a pressure activated bypass valve, said shock absorbers configured for assembly into the front suspension; and a pressure equalization line connecting said air spring and said at least one ping tank to a tank line and to a main system supply tank through at least one height control valve for maintaining a predetermined vehicle ride height.

9. A suspension kit for use in heavy duty vehicles having an independent front suspension including user-controlled air springs supplied by an air supply tank, said kit comprising:

an anti-roll bar having two ends, each end configured for connection to the front suspension in operational relationship to an associated one of two front wheel assemblies;

at least one supplemental ping tank separate from said air supply tank and being separate from, and in fluid communication with an associated one of the air springs;

a valve in fluid communication between each at least one ping tank and the associated air spring, each said valve powered by an electric motor for moving between an open position and a closed position;

a control switch connected to each said electric motor for powering said valve and under user control for selectively moving said valve between the open position, allowing fluid communication between said at least one ping tank and the air spring for achieving a softer vehicle ride, and the closed position, closing fluid communication between said at least one ping tank and the air spring for achieving a more responsive vehicle ride, said positions determined by the user for achieving desired suspension performance; and a pressure equalization line connecting said air spring and said at least one ping tank to a tank line and to a main system supply tank through at least one height control valve for maintaining a predetermined vehicle ride height.

\* \* \* \* \*